R. A. JONES.
MOTOR PROPELLED LAWN MOWER.
APPLICATION FILED JUNE 26, 1913.
1,127,260.
Patented Feb. 2, 1915.
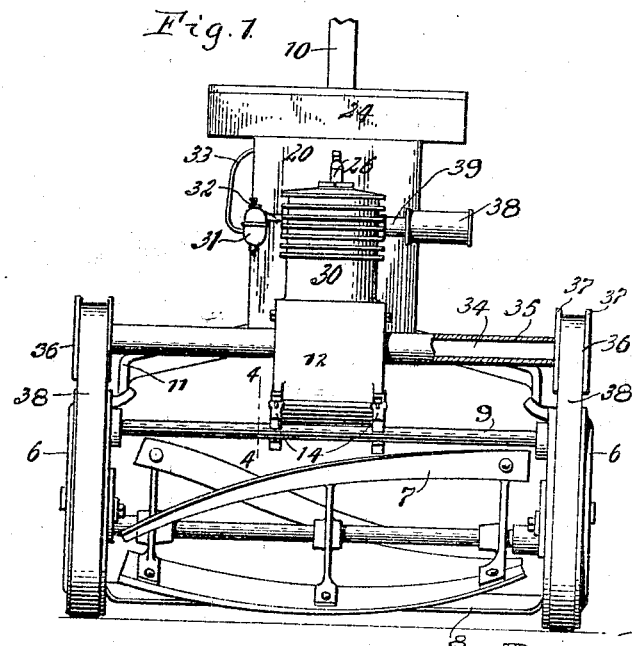
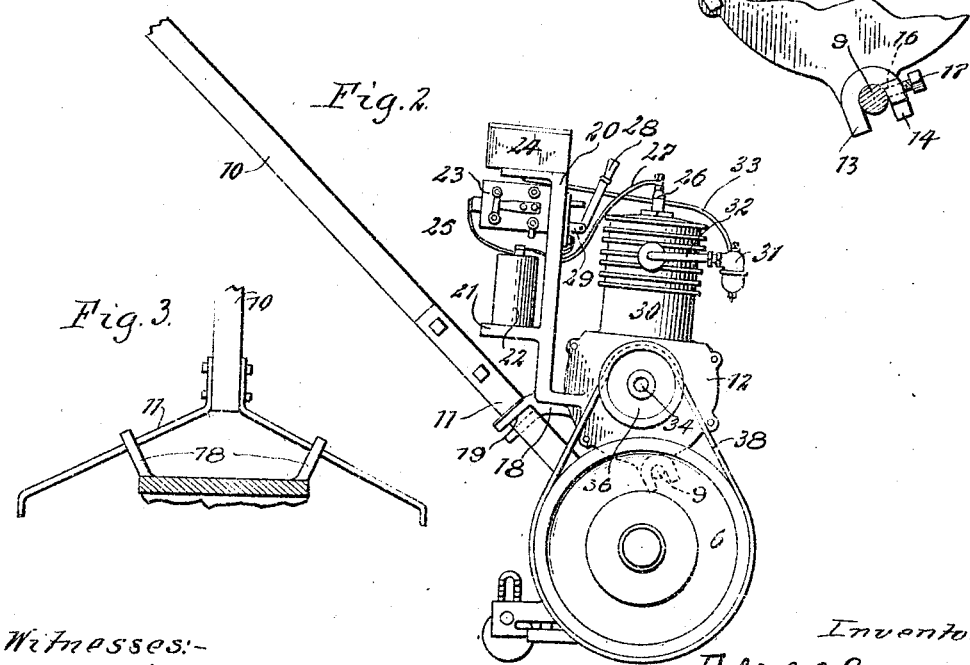
Witnesses:—
Richard Sommer
D. H. Harper
Inventor
Ralph A. Jones
by A. J. Sangster
Attorney

UNITED STATES PATENT OFFICE.

RALPH A. JONES, OF EAST AURORA, NEW YORK.

MOTOR-PROPELLED LAWN-MOWER.

1,127,260.

Specification of Letters Patent.

Patented Feb. 2, 1915.

Application filed June 26, 1913. Serial No. 775,950.

*To all whom it may concern:*

Be it known that I, RALPH A. JONES, a citizen of the United States, residing at East Aurora, State of New York, have invented certain new and useful Improvements in Motor-Propelled Lawn-Mowers, of which the following is a specification.

This invention relates to lawn mowers and particularly to a motor propelled mower.

An object of this invention is to provide a lawn mower having the usual traction wheels, means being provided for associating said traction wheels with power driven mechanism whereby the traction wheels are rotated and the driving belt is caused to travel around and under the traction wheels, thereby increasing the driving power of the said belts as the frictional contact of the belts with the ground or turf over which the motor is traveling will increase the driving power thereof.

A still further object of this invention is to provide a lawn mower having novel means for supporting a motor and means for communicating the motion of the motor to the mower or to the traction wheels thereof as well as in novel means for suspending or supporting the said motor from the frame of the said mower.

A still further object of this invention is to provide a mower and a motor having a base of such configuration as to be readily applicable to a frame of a mower and to the handle thereof, thus providing means for applying motors to mowers now in common use without changes in the construction of said mowers.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a front view of a mower with the motor applied thereto; Fig. 2 illustrates a side elevation thereof; Fig. 3 illustrates a detail view of a fragment of the motor frame and a fragment of the handle of a lawn mower; and Fig. 4 illustrates a detail view showing in side elevation a fragment of the crank casing of the motor and showing the means of attaching the same to the frame of a mower.

In these drawings 6 denotes the traction wheels of an ordinary mower, 7 the rotating blades thereof, 8 the stationary blade with which the rotating blades coact and 9 the usual brace rod which extends between the casings or frame of the traction wheels, which parts may be of ordinary construction.

It will be observed that the handle 10 has the forked yoke 11 connected to it by which the handle is pivotally connected to the rod 9 and in ordinary mowers, these elements are employed for pushing the mower whereas in the present invention, they need be used only for the purpose of guiding the same.

As a means for attaching the motive power to the mower a crank case 12 is provided for the motor, the said crank case having at each end and near its front side a pair of lugs 13 and 14 with a space therebetween forming a seat for the rod 9, the said lug 14 having a threaded aperture 16 for the reception of the set screw 17, which set screw is designed for the purpose of binding the rod 19 and retaining the motor case in proper position thereon. The crank case at the rear is provided with the arms 18 supplied with bifurcations 19 which embrace the arms of the yoke 11 and rest thereon, so that the motor is held in proper position and it is the purpose of the inventor to so mount the motor as to permit it to have such motion that it will follow the travel of the handle as the said handle moves in the arc of a circle. It is obvious from the fact that the motor is suspended at four points and that it is clamped to the rod 9, it cannot be displaced by ordinary use and that the lawn mower may be conveniently manipulated or guided through the operation of the handle just described. The crank case 12 is further provided with a bracket 20 having a shelf 21 thereon for the support of a battery 22, the said bracket furthermore serving as a support for the switch board 23 and the fuel tank 24. The switch 23 is in electrical connection with the battery 22 through the medium of the conductor 25 and the said battery is furthermore in electrical connection with the spark plug 26 of the motor through the medium of a conductor 27. The switch board is shown as having a knife switch 28 pivoted to the plate 29 and it is the intention of the inventor to have the switch make and break the circuit from the battery to the spark plug of the motor. As shown in the drawings, the spark plug is applied to the cylinder 30 and a carbureter 31 is piped by the conduit 32 to the interior of the cylinder and is in communication with the fuel tank 24 designed to contain gasolene or the like by the pipe 33, thus insuring a proper fuel supply for the motor when the same is in operation.

A shaft 34 extends from each side of the crank case, the same being driven from the crank shaft, not shown, above the motor, and the said shaft 34 is rotatable in a sleeve 35 which extends from each side of the case and acts as a bearing for the said shaft. A pulley 36 is mounted on each end of the shaft 34, the said pulley having side flanges 37 for the purpose of retaining the belt 38 thereon, the said belt being extended around the traction wheel 6. As each traction wheel is provided with a belt and parts associated therewith for driving the same, it will be understood that each end of the mower is provided with parts which are duplicates of those just described, and that by reason of their presence, the motion of the motor or crank shaft thereof is communicated to the traction wheels and that thereby the said mower is propelled. As the relative size of the pulleys and traction wheels may be varied to suit particular requirements for moving the motor at a greater or less speed, it follows that they may be changed to suit particular requirements. A muffler 38 is connected to the exhaust pipe 39, leading from the cylinder and thereby means are provided for operating the motor without undue noises occasioned by the explosions within the motor and the exhaust of the explosive charge.

In the foregoing description I have shown the preferred form of my invention, but I do not limit myself thereto, as I am aware that modifications may be made therein without departing from the spirit or sacrificing any of the advantages thereof, and I therefore reserve the right to make such changes as fairly fall within the scope of my invention. The driving mechanism is shown as a pulley drive, but may be chain, shaft or friction drive without departing from the spirit of my invention.

I claim—

1. In a lawn mower, a frame including a transverse brace rod, and a handle movably projecting from the frame, a motor including a crank case, pairs of lugs projecting in spaced relation from the crank case to embrace the brace rod, means carried by one of the lugs to engage the rod and secure the case thereto, and means projecting from the crank case to engage the handle.

2. In a lawn mower, a frame including a transverse brace rod and a handle including a yoke movably connected to the frame, a motor having a crank case, lugs projecting from the case and embracing the rod, set screws carried by the lugs to engage the rod, and spaced pairs of lugs projecting from the case and removably engaging the respective members of the yoke.

RALPH A. JONES.

Witnesses:
 D. H. Harper,
 E. C. Plueckhahn.